United States Patent [19]

Günther et al.

[11] Patent Number: 4,652,144
[45] Date of Patent: Mar. 24, 1987

[54] TEMPERATURE SENSING SEMICONDUCTOR CIRCUIT

[75] Inventors: Uwe Günther, Nufringen; Karl Nagel, Gomaringen; Bernd Kalkhof, Reutlingen, all of Fed. Rep. of Germany

[73] Assignee: Robert Bosch GmbH, Stuttgart, Fed. Rep. of Germany

[21] Appl. No.: 722,184

[22] Filed: Apr. 10, 1985

[30] Foreign Application Priority Data

May 10, 1984 [DE] Fed. Rep. of Germany ....... 3417211

[51] Int. Cl.$^4$ .......................... G01K 1/20; G01K 7/14
[52] U.S. Cl. ..................................... 374/178; 307/310; 357/28; 323/907
[58] Field of Search .................. 374/178, 163; 357/28

[56] References Cited

U.S. PATENT DOCUMENTS

| | | | |
|---|---|---|---|
| 3,668,440 | 6/1972 | Davis et al. | 307/310 |
| 3,671,770 | 6/1972 | Frederiksen | 307/310 |
| 3,916,508 | 11/1975 | Conzelmann et al. | 374/183 |
| 3,943,434 | 3/1976 | Haeusler et al. | 374/173 X |
| 4,004,462 | 1/1977 | Dobkin | 374/173 |
| 4,194,134 | 3/1980 | Bjorklund et al. | 307/310 X |
| 4,268,759 | 5/1981 | Gilbert | 307/310 X |
| 4,295,088 | 10/1981 | Malchow | 307/310 X |
| 4,350,904 | 9/1982 | Corkel | 307/310 |
| 4,497,586 | 2/1985 | Nelson | 374/178 |

OTHER PUBLICATIONS

H. M. Rein, Ranfft "Integrierte Bipolarschaltungen" (Halbleiter-Elektronik, Band 13) Springer-Verlag, pp. 272, 273, (1980).
IEEE Journal of Solid State Circuits, vol. SC 17, No. 6, (Dec. 1982), p. 1198.

Primary Examiner—Daniel M. Yasich
Attorney, Agent, or Firm—Michael J. Striker

[57] ABSTRACT

The temperature sensing circuit includes a source of constant current $I_S$, a voltage divider $R_1$, $R_2$ and an output transistor $T_1$ whose base collector circuit is connected parallel to the first resistor and whose base emitter circuit is connected parallel to the second resistor. An auxiliary source of current having a positive temperature coefficient is connected in series with the first resistor of the voltage divider to cause a voltage drop thereon having an opposite temperature coefficient than the output voltage $U_S$ generated at the collector-emitter circuit of the output transistor.

10 Claims, 8 Drawing Figures

TEMPERATURE SENSING SEMICONDUCTOR CIRCUIT

BACKGROUND OF THE INVENTION

This invention relates to a temperature sensing circuit generating an output voltage indicative of temperature, the circuit being of the type which includes a source of a substantially constant current, a voltage divider having a first resistor and a second resistor connected in series to the constant current source, a first transistor whose base-collector path and base-emitter path are connected, respectively, parallel to the first and second resistors whereby the output voltage is generated across the collector-emitter path.

From the U.S. Pat. No. 3,916,508 a current supply source of reference voltage is known wherein a first current branch includes in series connection a number of diodes and zener diodes connected in forward direction; and a parallel connected second current branch also including a number of diodes connected in forward direction one after the other and also including an ohmic voltage divider; the reference voltage is kept at the common point of the voltage divider. This prior art circuit generates temperature dependent reference voltages which have either a positive or a negative temperature coefficient. Accordingly this known circuit can be employed not only as a source of constant voltage but also as a voltage generating temperature sensor. However, if a specific temperature coefficient is desirable, this known circuit allows the generation of preset discrete voltage values at the output of the sensor.

Known are also circuit arrangements which deliver a continuously adjustable temperature-dependent output voltage having a positive temperature coefficient only. For example, from the magazine IEEE Journal of Solid State Circuits, Vol. SC-17, No. 6 (December 1982), page 1198, FIG. 3, a circuit is known which delivers an output current which is proportional to temperature in degrees Calsius. For generating this output current, it employs an internal reference voltage having positive temperature coefficients which are proportional to absolute temperature.

From the textbook of H. M. Rein and R. Ranfft "Integrierte Bipolarschaltungen (Halbleiter-Elektronik, Band 13)", Springer-Verlag,1980 page 272 FIG. 5.6 - 1a, a temperature sensor of this kind is known. This temperature sensing circuit which in the literature is frequently described as a "$U_{BE}$-amplifier" has a negative temperature coefficient. By varying voltage dividing ratio of a voltage divider connected to its control electrode and at a suitable selection of absolute values of the resistors in the voltage divider, the output voltage and its negative temperature coefficients can be continuously adjusted. In this known circuit, however, the magnitude of the adjustable temperature coefficient is bound to the value of the output voltage (at a fixed reference temperature).

SUMMARY OF THE INVENTION

It is, therefore, a general object of the present invention to overcome the disadvantages of prior art temperature sensing circuits of this kind.

In particular, it is an object of this invention to provide a temperature sensor whose temperature coefficient can be adjusted in a broad range independently on the output voltage.

Another object of this invention is to provide such an improved temperature sensor which is substantially insensitive to fluctuations of current flowing therethrough.

In keeping with these objects and others which will become apparent hereinafter, one feature of this invention resides, in a temperature sensor of the aforedescribed kind employing the known "$U_{BE}$ amplifier" whose output voltage which is indicative of temperature, has a negative temperature coefficient,in a combination which includes means for generating on a first resistor of a voltage divider a voltage drop which has a positive temperature coefficient and which is superposed to the output voltage of the amplifier so that at a certain reference temperature the two ohmic resistors constituting the voltage divider can be adjusted such that the resulting temperature coefficient of the output voltage can be varied in broad limits independently from the magnitude of the output voltage.

Depending on the selection of the ratio of the two voltage components resulting across the respective ohmic resistors of the voltage divider biasing the transistor amplifier of the sensor, it is possible to adjust a greater or smaller negative temperature coefficient of the output voltage. In a limit case the output voltage can have a temperature coefficient zero or even a small positive temperature coefficient. Due to the minute differential of inner resistance of the temperature sensor in its active range, the temperature dependent output voltage is substantially insensitive to fluctuations of current supplied to the sensor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
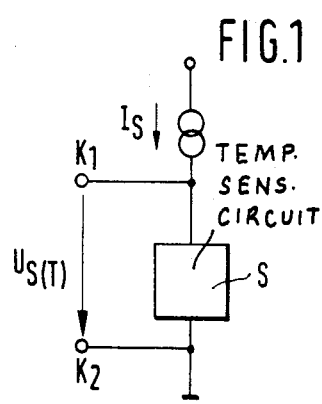
FIG. 1 is a block circuit diagram of a current consuming, voltage generating temperature sensor.

FIG. 1 illustrates a current fed, voltage generating temperature sensing circuit S in the form of a two terminal block. If circuit S is supplied with a constant current $I_S$ then between its output terminals $K_1$ and $K_2$ a temperature dependent output voltage $u_s(t)$ is generated.

Figure 2:
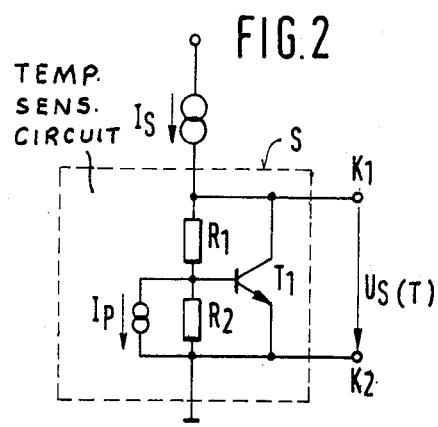
FIG. 2 is an embodiment of a simple temperature sensor of this invention including a current source, a voltage divider, a transistor and an auxiliary current source.

FIG. 2 shows a first example of a real embodiment of a current consuming, voltage generating temperature sensor of FIG. 1. In this embodiment, the temperature sensing circuit S includes an npn transistor $T_1$ whose collector-emitter circuit is bridged by a voltage divider consisting of a series connection of ohmic resistor $R_1$ and $R_2$. The tapping point of the voltage divider is connected to the base of the transistor so that the base-collector circuit is bridged by the resistor $R_1$ and base-emittor circuit is bridged by the second resistor $R_2$. This circuit, as mentioned before, is designated in literature as a "$U_{BE}$-amplifier". The connection point of the collector and of the first register $R_1$ is connected to a source of a constant current $I_S$. A source of an auxiliary current $I_P$ having a positive temperature coefficient is connected in series with the resistor $R_1$ and parallel to the second resistor $R_2$. The temperature dependent output voltage $U_S(T)$ of the circuit S is generated across the collector-emittor circuit and applied to the output terminals $K_1$ and $K_2$.

Figure 3:
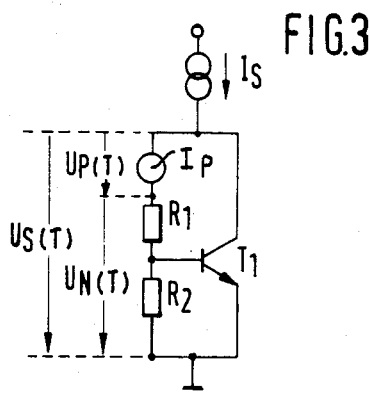
FIG. 3 is an equivalent circuit of the sensor of FIG. 2.

The operation of the temperature sensing circuit S of FIG. 2 and of the equivalent circuit of FIG. 3 is as follows:

The output voltage $U_S(T)$ is composed of a first voltage component $U_N(T)$ having a negative temperature coefficient and of a second voltage component $U_P(T)$ having a positive temperature coefficient. As indicated in the equivalent circuit of FIG. 3, the first voltage component $U_N(T)$ is the voltage drop across the voltage divider $R_1$, $R_2$ and corresponds to the output voltage of a conventional "$U_{BE}$-amplifier" when no auxiliary current source $I_P$ is applied to the second resistor $R_2$. The second partial voltage or voltage component $U_P(T)$ is the voltage drop across the first resistor $R_1$ when the additional auxiliary current source $I_P$ having a positive temperature coefficient is connected in series with resistor $R_1$ and the latter voltage drop is added to the first mentioned partial voltage $U_N$:

$$U_S(T) = U_N(T) + U_P(T) \quad (1)$$

Consequently, by a suitable selection of values of the two ohmic resistors $R_1$ and $R_2$ and/or by making these resistors equal, it is possible to adjust in broad limits both the output voltage $U_S(T)$ (at a given reference temperature) and the temperature coefficient of the output voltage $U_S(T)$ whereby the adjustment of these two parameters can be made independently one from the other.

Figure 4:
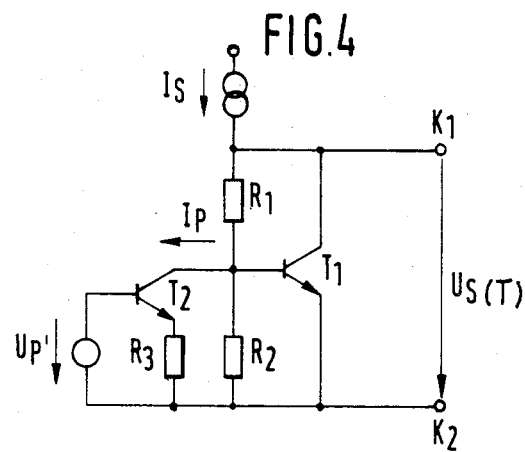
FIG. 4 is a modification of the sensor of FIG. 2 in which the auxiliary current source is in the form of a controllable transistor having an ohmic resistor in its collector path.

FIG. 4 shows the embodiment of FIG. 2 in greater detail. The auxiliary current source for supplying the auxiliary current $I_P$ in the first resistor $R_1$ is a second npn-transistor $T_2$ whose collector is connected to the tapping point of the voltage divider $R_1$, $R_2$ and whose emitter is connected via resistor $R_3$ to the emitter of the first transistor $T_1$. A source of control voltage $U_{P'}$ is applied between the base of the second transistor $T_2$ and the emitter of the first transistor $T_1$. By means of the control voltage the second transistor $T_2$ is adjusted so as to feed a collector current $I_P$ with a positive temperature coefficient in the first resistor $R_1$ of the voltage divider. The function of the circuit arrangement of FIG. 4 therefore is the same as that of the circuit of FIG. 2.

Figure 5:
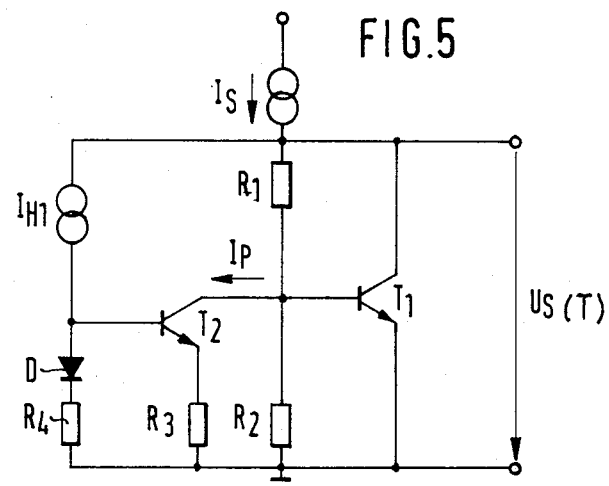
FIGS. 5 and 6 illustrate further modifications of the circuit of FIG. 4, including a control circuit for the resistor of the auxiliary current source.

In FIG. 5 an embodiment is illustrated which includes a first example of a real control circuit for the second transistor $T_2$ of the sensing circuit of FIG. 4. In order to generate a control voltage $U_{P'}$ (FIG. 4) there is provided a current source $I_{H1}$ having a positive temperature coefficient and connected in series with a diode D oriented in the forward direction and with an ohmic resistor $R_4$. The current source $I_{H1}$ is connected between the collector of the first transistor $T_1$ and the base of the second transistor $T_2$ and the series connection of the diode D and of the resistor $R_4$ is connected between the base of the second transistor $T_2$ and the emitter of the first transistor $T_1$. Due to the positive temperature coefficient of the current source $I_{H1}$ the second transistor $T_2$ in cooperation with the diode D and the resistor $R_4$ is adjusted such that its collector current $I_P$ exhibits positive temperature coefficient and therefore the desired voltage drop $U_P(T)$ caused by the collector current in the first resistor $R_1$ has also positive temperature coefficient which according to the beforementioned equation (1) is superposed to the voltage drop $U_N(T)$ having the negative temperature coefficient across the voltage divider $R_1$, $R_2$. The resulting combined voltage $U_S(T)$ the output of the sensor is composed of the superposed voltage component $U_P(T)$ generated due to the current source $I_{H1}$ and the voltage component $U_N(T)$ generated by the "$U_{BE}$-amplifier".

Figure 6:
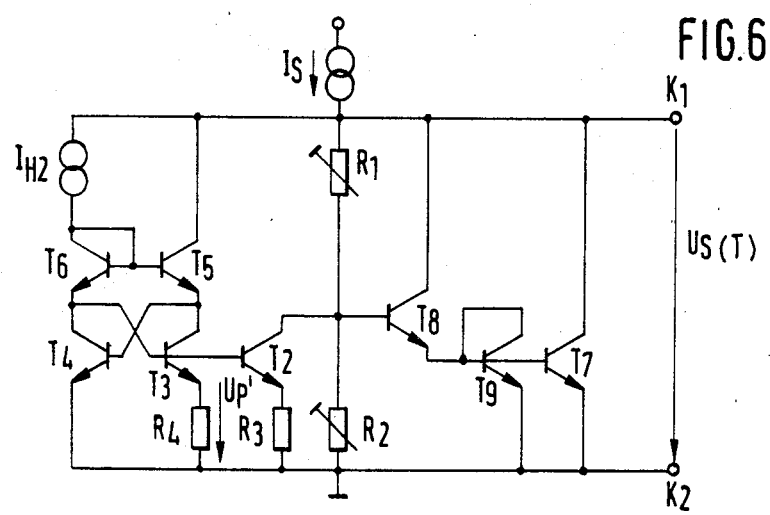

FIG. 6 shows another modified embodiment of the control circuit for the second transistor $T_2$ of FIG. 4. To generate the control voltage $U_{P'}$ there are provided circuit elements $R_4$, $T_3$, $T_4$, $T_5$, $T_6$, $I_{H2}$. In this embodiment, the first transistor $T_1$ is substituted by a combination of transistors $T_7$, $T_8$ and $T_9$. The emitters of transistors $T_7$ and $T_9$ are grounded. The emitter of the second transistor $T_2$ is grounded via an ohmic resistor $R_3$ and the emitter of an npn-transistor $T_3$ is grounded via an ohmic resistor $R_4$. The emitter of transistor $T_4$ is directly connected to ground. The base of the transistor $T_4$ is connected to the collector of the transistor $T_3$ while the collector of the transistor $T_4$ is connected to the base of the transistor $T_3$. There is provided also an npn-transistor $T_5$ whose emitter is connected to the collector of the transistor $T_3$ and whose base is connected to the base of another npn-transistor $T_6$. The emitter of the transistor $T_6$ is connected to the collector of transistor $T_4$ and via an auxiliary current source $I_{H2}$ to the collectors of transistors $T_5$, $T_8$ and $T_7$ and to the voltage divider $R_1$ and $R_2$. The ratio between the emitter surfaces of the transistors $T_4$ and $T_3$ is 1:7, and the ratio of emitter surfaces of transsistors $T_6$ and $T_5$ is 7:1.

As mentioned before, the embodiment of FIG. 6 includes a modified version of the conventional "$U_{BE}$-amplifier". The voltage divider $R_1$ and $R_2$ remains the same as in the preceding examples and the resistors in the divider are adjustable resistors. The first transistor $T_1$ of FIGS. 2 to 4 is replaced by a Darlington circuit including an end stage transistor $T_7$ and a preliminary amplifying npn-transistor $T_8$. The output voltage $U_S(T)$ of the temperature sensing circuit is generated across the emitter-collector circuit of the transistor $T_7$. The base of the preliminary amplifying transistor $T_8$ is connected to the tapping point on the voltage divider $R_1$, $R_2$. The npn-transistor $T_9$ in the Darlington circuit is connected as an emitter-base diode between the base of transistor $T_7$ and ground.

Similarly as in the preceding examples, the output voltage $U_S(T)$ of the circuit of FIG. 6 is again composed of the sum of two partial voltage $U_N(T)$ and $U_PS(T)$ according to the equation (1) whereby each voltage component has an opposite temperature coefficient. The source of voltage having negative temperature coefficient assembled of circuit elements $R_1$, $R_2$, $T_7$, $T_8$ and $T_9$ represents the known "$U_{BE}$-amplifier" which generates output voltage $U_N(T)$:

$$U_N = \left(1 + \frac{R_1}{R_2}\right) \cdot 2U_{BE} + R_1 \cdot I_C(T_8) \cdot \frac{1}{B}. \quad (2)$$

wherein: $R_1$ and $R_2$ are values of the resistors of the voltage divider, $U_{BE}$ denotes equal base-emitter voltages of transistors $T_7$, $T_8$ and $T_9$, $I_C(T_8)$ is the collector current of transistor $T_8$ and B is current amplification factor of the transistor $T_8$.

For the temperature coefficient $TK_U$ of the voltage component $U_N$ the following approximation is valid:

$$TK_N = \left(1 + \frac{R_1}{R_2}\right) \cdot 2TK_{BE} + R_1 \cdot I_C(T_8) \cdot \frac{1}{B}(K_R - K_B). \quad (3)$$

wherein $TK_{BE}$ are respective temperature coefficients of the same magnitude of the base-emitter voltages of transistors $T_7$, $T_8$ and $T_9$, $K_R$ is a simple approximation of the temperature coefficient of resistors $R_1$ and, $R_2$ and $K_B$ is a simple approximation of the temperature coefficient of the current amplification factor B.

The source of voltage having positive temperature coefficient consists of the part of the circuit which supplies a current having positive temperature coefficient in the resistor $R_1$. In this example, the voltage source with positive temperature coefficient consists of transistors $T_2$ through $T_6$, resistors $R_3$ and $R_4$, and the auxiliary current source $I_{H2}$. In this circuit, voltage across the resistor $R_4$ meets the following equation:

$$U_{R4} = 2\frac{kT}{e}\ln 7 = 2 U_T \ln 7. \quad (4)$$

whereby k is Boltzmann constant and $U_T$ is the temperature dependent voltage. Current supplied from the collector of the transistor $T_2$ in the resistor $R_1$ of the voltage divider $R_1$, $R_2$ meets the following equation:

$$I_P = \frac{1}{R_3}(2 U_T \ln 7 - [U_{BE}(T_2) - U_{BE}(T_3)]). \quad (5)$$

Accordingly, current $I_P$ generates a voltage $U_P$ which is added to the voltage $U_N$ of the "$U_{BE}$-amplifier":

$$U_P = \frac{R_1}{R_3}(2 U_T \ln 7 - [U_{BE}(T_2) - U_{BE}(T_3)]). \quad (6)$$

The temperature coefficient of the voltage $U_P$ is positive and is computed as follows:

$$TK_P = \frac{R_1}{R_3}\left(2\frac{k}{e}\ln 7 - [TK_{BE}(T_2) - TK_{BE}(T_3)]\right). \quad (7)$$

The output voltage $U_S(T)$ of the temperature sensing circuit according to FIG. 6 results from the equation (1) with $U_P$ and $U_N$ computed from equations (6) and (2). The temperature coefficient $TK_S$ of the sensing circuit results from equation $$TK_S = TK_P + TK_N \quad (8)$$

wherein $TK_P$ and $TK_N$ are determined from equations (7) and (3), and are dependent on $U_P$ and $U_N$.

It is evident that this invention makes it possible to generate a sensor output voltage $U_S$ having a different ratio of voltage components $U_P$ and $U_N$ so that according to this ratio the sensor voltage $U_S$ has different temperature coefficients $TK_S$. The adjustment of the voltage component $U_P$ having a positive temperature coefficient takes place at the first resistor $R_1$ of the voltage divider whereas the voltage component $U_N$ having negative temperature coefficient is adjusted by the ratio $R_1/R_2$, that is across the second resistor $R_2$.

For balancing the sensor voltage, the voltage on the third resistor $R_3$ is measured and the measured voltage correponds to the equation (5) as follows:

$$U_{R3} = 2U_T \ln 7 - [U_{BE}(T_2) - U_{BE}(T_3)] \quad (5a)$$

In addition, there is measured at a predetermined current, the base-emitter voltage of parallel connected transistors $T_7$ and $T_9$ and also the current gain B of the transistor $T_8$. From these magnitudes and from the predetermined values for the output voltage and the temperature coefficients of the sensor, the values of resistors $R_1$ and $R_2$ are computed whereby the resistor $R_2$ is first adjusted to the computed value and thereafter the output voltage of the sensor is balanced for example 25° C. on the first resistor $R_1$.

Figure 7:
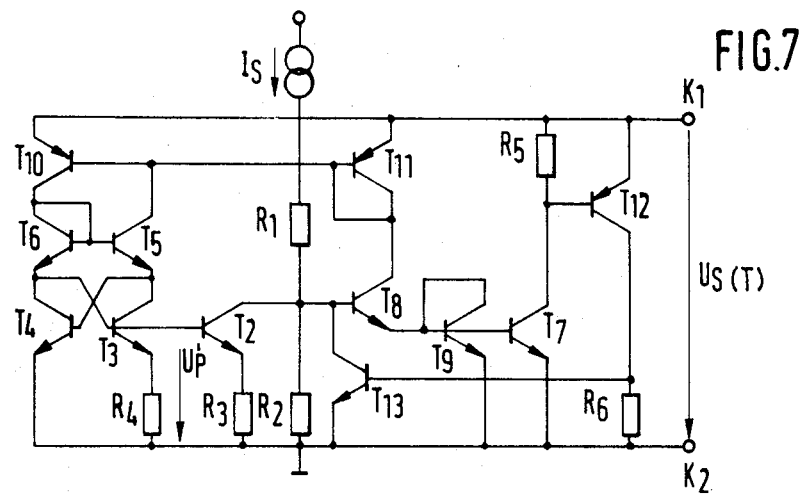
FIG. 7 is a temperature sensor similar to FIG. 6 but including a current inverting circuit for supplying the control circuit of the auxiliary current source.

Another exemplary embodiment of the sensor of this invention is illustrated in FIG. 7 representing a further elaboration of the embodiment of FIG. 6. The auxiliary current source $I_{H2}$ of FIG. 6 is formed in this example by a current reflecting circuit consisting of pnp-transistors $T_{10}$ and $T_{11}$, the latter transistor being connected as a diode. The transistor $T_{10}$ has its collector connected to the collector of transistor $T_6$ and the transistor $T_{11}$ has its collector connected to the collector of transistor $T_8$ so that the output current of the auxiliary current source $I_{H2}$ (FIG. 6) in the example of FIG. 7 is generated by the reflection of the collector current of the transistor $T_8$. The magnitude of $I_{H2}$ is determined by the ratio of emitter currents of transistors $T_{10}$ and $T_{11}$.

In the example of FIG. 7 is also provided a current limitinq safety circuit which limits the power consumption of the sensor to a maximum permissible value. For this purpose, the collector circuit of transistor $T_7$ is connected in series with a resistor $R_5$ which in turn is connected parallel to the base-emitter circuit of a pnp-transistor $T_{12}$. Collector of the transistor $T_{12}$ is grounded via resistor $R_6$ and is connected to a base of an npn-transistor $T_{13}$ having a directly grounded emitter and a collector connected to the base of transistor $T_7$ and to the tapping point of the voltage divider $R_1$, $R_2$.

The operation of the current limiting protective circuit is as follows:

If current through transistor $T_7$ causes a voltage drop across the resistor $R_7$ which exceeds the base-emitter voltage of transistor $T_{12}$, then the latter transistor becomes conductive. As a consequence, transistor $T_{13}$ which is controlled by the voltage drop across resistor $R_6$ limits the base current of transistor $T_8$ and accordingly, the overall current consumption of the circuit.

Figure 8:
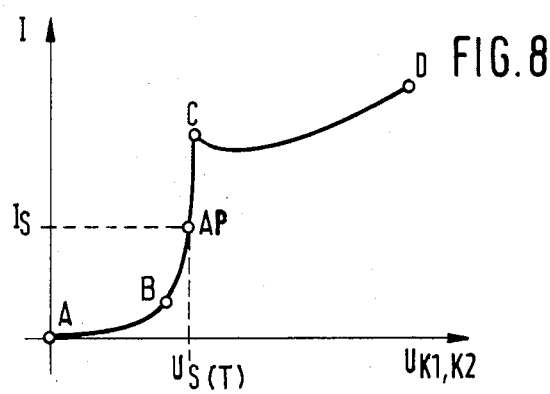
FIG. 8 is a block diagram of the voltage versus current characteristics of the embodiment of FIG. 7.

FIG. 8 illustrates the current-voltage characteristic of the sensor according to FIG. 7. It will be seen that the characteristic line can be subdivided in three regions, namely:

(a) the starting region A–B,
(b) the active region B–C, and (c) the current limiting region C–D.

If the sensor is controlled in its active range (working point AP) by a constant current (about 1 mA) from a current source $I_S$, then the temperature dependent voltage $U_S(T)$ is generated at the two output terminals $K_1$ and $K_2$. Due to the minute differential resistance in the active, range of the sensor, the temperature dependent voltage $U_S(T)$ is relatively insensitive to fluctuations of the current $I_S$.

It will be understood that each of the elements described above, or two or more together, may also find a useful application in other types of constructions differing from the types described above.

While the invention has been illustrated and described as embodied in specific examples of temperature sensing circuits, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A temperature sensing circuit for generating an output voltage indicative of temperature, comprising a source of a substantially constant current, an ohmic voltage divider having a first resistor having a first value and a second resistor having a second value and connected in series with said constant current source, a first transistor whose base-collector circuit is connected parallel to said first resistor and whose base-emitter circuit is connected parallel to said second resistor, said first transistor generating across its collector-emitter circuit an output voltage including an initial voltage component having a positive or a negative temperature coefficient, a source of an auxiliary current attached to the base of said transistor and to said second resistor, the auxiliary current source having an opposite temperature coefficient than that of the initial voltage component to generate across said first resistor an auxiliary voltage component having said opposite temperature coefficient, said auxiliary voltage component combining with said initial voltage component to generate a temperature indicating output voltage whose temperature coefficient corresponds to the combined temperature coefficients of said voltage components.

2. A temperature sensing circuit as defined in claim 1, wherein said source of an auxiliary current includes a second transistor having its collector connected to the tapping point of said voltage divider, its emitter connected to the emitter of the first transistor via a third resistor, and its base connected to a source of auxiliary voltage having a positive temperature coefficient, the magnitude of said auxiliary voltage component exceeding the base emitter voltage of the second transistor.

3. A temperature sensing circuit as defined in claim 2, wherein said source of auxiliary voltage includes a series connection of an additional current source with a diode connected in forward direction and a fourth resistor, said series connection being connected across the collector emitter circuit of said first transistor and the connection point between the additional current source and said diode being connected to the base of said second transistor.

4. A temperature sensing circuit as defined in claim 2, wherein said source of auxiliary voltage includes a series connection of an additional current source with a third transistor, fourth transistor, a fifth transistor and a sixth transistor in which the omitter of the third transistor is connected to a ground point through said fourth resistor, said fourth transistor having its emitter directly connected to the ground point, the emitter of the fifth transistor being connected to the collector of the third transistor and to the base of the fourth transistor, and the emitter of the sixth transistor being connected to the collector of the fourth transistor and to the base of the third and second transistors, the base of said fifth and sixth transistors being connected to the collector of the sixth transistor and to one terminal of the additional current source, and the other terminal of the additional current source being connected to the collector of the fifth transistor, to the connection point between the constant current source and the voltage divider, and to the collector of the first transistor.

5. A temperature sensing circuit as defined in claim 4, wherein said first transistor is includes in a Darlington circuit of a seventh transistor and an eight transistor, whereby said output voltage of the sensor is generated at the emitter-collector circuit of the seventh transistor, and the base of the eighth transistor is connected to the tapping point of the voltage divider.

6. A temperature sensing circuit as defined in claim 5, further cmprising a ninth transistor connected as an emitter base diode in parallel to the emitter base circuit of the seventh transistor.

7. A temperature sensing circuit as defined in claim 5, wherein said additional current source includes a current reflecting circuit for generating output current of the additional current source by reflecting the collector current of the eighth transistor.

8. A temperature sensing circuit as defined in claim 7 wherein said current reflecting circuit includes a tenth transistor and eleventh transistor, the collector of the tenth transistor being connected to the collector of the sixth transistor and the collector of the eleventh transistor being connected to the collectors of the eighth transistor and of the fifth transistor and to the bases of the tenth transistor and of the eleventh transistor.

9. A temperature sensing circuit as defined in claim 8, further including a current limiting safety circuit which limits the current passing through the sensing circuit to a maximum permissible value.

10. A temperature sensing circuit as defined in claim 8, wherein said current limiting safety circuit includes a thirteenth transistor and a twelfth transistor of opposite type, the twelfth transistor having its base connected to the collector of the seventh transistor and via a fifth resistor to the source of constant current, the collector of the twelfth transistor being grounded via a sixth resistor and connected to the base of the thirteenth transistor, the emitter of the thirteenth transistor being grounded and the collector being connected to the base of the eighth transistor and to the tapping point of the voltage divider.

* * * * *